(12) United States Patent
Patane

(10) Patent No.: US 9,745,699 B2
(45) Date of Patent: Aug. 29, 2017

(54) COPOLYMERS OF STARCH AND CELLULOSE

(71) Applicant: EMPIRE TECHNOLOGY DEVELOPMENT LLC, Wilmington, DE (US)

(72) Inventor: Michael Patane, Balgowlah Heights (AU)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 14/440,923

(22) PCT Filed: Nov. 6, 2012

(86) PCT No.: PCT/US2012/063643
§ 371 (c)(1),
(2) Date: May 6, 2015

(87) PCT Pub. No.: WO2014/074086
PCT Pub. Date: May 15, 2014

(65) Prior Publication Data
US 2015/0299957 A1     Oct. 22, 2015

(51) Int. Cl.
| | | |
|---|---|---|
| D21H 17/25 | (2006.01) |
| D21H 17/28 | (2006.01) |
| C08B 15/10 | (2006.01) |
| C08B 31/00 | (2006.01) |
| C04B 24/38 | (2006.01) |
| C08B 15/00 | (2006.01) |
| C08J 5/18 | (2006.01) |
| C08G 81/00 | (2006.01) |
| C08J 3/24 | (2006.01) |

(52) U.S. Cl.
CPC .......... *D21H 17/28* (2013.01); *C04B 24/383* (2013.01); *C08B 15/00* (2013.01); *C08B 31/00* (2013.01); *C08G 81/00* (2013.01); *C08J 3/246* (2013.01); *C08J 5/18* (2013.01); *D21H 17/25* (2013.01); *C08J 2303/12* (2013.01); *C08J 2401/02* (2013.01)

(58) Field of Classification Search
CPC .......... D21H 7/24; D21H 17/25; D21H 17/28; D21H 21/18; D21H 21/19; D21H 21/20; C08B 15/00; C08B 31/00; C08B 15/005; C08B 15/10; C08B 31/003; C08B 31/185; C08B 33/00; C08J 2401/02; C08J 2303/12; C08J 2301/02; C08J 2403/12
USPC .... 162/175–177; 106/162.5, 162.51, 162.71, 106/162.81, 206.1; 526/200; 536/102, 536/105, 106, 123.1
See application file for complete search history.

(56) References Cited

U.S. PATENT DOCUMENTS

| | | | |
|---|---|---|---|
| 3,001,884 A * | 9/1961 | Nijhoff ................. | C08B 31/08 106/162.81 |
| 3,353,904 A | 11/1967 | Englert et al. | |
| 3,508,941 A * | 4/1970 | Johnson ............ | A22C 13/0013 106/141.1 |
| 4,481,076 A | 11/1984 | Herrick | |
| 4,592,795 A * | 6/1986 | Bridgeford ........ | A22C 13/0013 138/118.1 |
| 5,656,682 A | 8/1997 | Rimsa et al. | |
| 7,494,566 B2 | 2/2009 | Carroll et al. | |
| 8,153,783 B2 | 4/2012 | Muller et al. | |
| 2004/0103824 A1* | 6/2004 | Einfeldt ............... | C04B 24/168 106/805 |
| 2006/0286285 A1 | 12/2006 | Woo et al. | |
| 2007/0167618 A1 | 7/2007 | Wang et al. | |
| 2007/0212475 A1 | 9/2007 | Augustin et al. | |
| 2010/0087687 A1 | 4/2010 | Medoff | |
| 2012/0187226 A1 | 7/2012 | Tarverdi et al. | |

FOREIGN PATENT DOCUMENTS

| | | | |
|---|---|---|---|
| CN | 102121208 | * | 7/2011 |
| JP | 2008-138030 | * | 6/2008 |
| WO | WO2012/057751 A1 | | 5/2012 |

OTHER PUBLICATIONS

Jiangfeng et al.,Investigation of the Viscosity and Gelatinization Temperature of Four Kinds of Esterified and Cross-linked Cassava Starch, Modern Food Science and Technology (Oct. 31, 2010), 26(10):1100-1103, 1056. English abstract attached.

Yongping et al.,Research on Physical Property of Cassava Starch, Cellulose Graft Copolymer Biodegradable Vlaterials, Chinese Journal of Tropical Agriculture (Aug. 31, 1999), 4:6-12. English abstract attached.

International Search Report and Written Opinion for International Application No. PCT/US2012/063643 mailed Mar. 14, 2013.

Cao et al., Starch-based nanocomposites reinforced with flax cellulose Nanocrystals, *eXPRESS Polymer Letters* (2008), 2(7):502-510.

Labet et al., Polymer grafting onto starch nanocrystals, *Biomacromolecules* (Aug. 4, 2007), 8: 2916-2927.

Lu et al., Starch-based completely biodegradable polymer materials, *eXPRESS Polymer Letters* (2009), 3(6):366-375.

Shah et al., Biological degradation of plastics, a comprehensive review, *Biotechnology Advances* (Jan. 26, 2008), 26:246-265.

\* cited by examiner

*Primary Examiner* — Eric Hug
(74) *Attorney, Agent, or Firm* — Pepper Hamilton LLP

(57) ABSTRACT

Copolymers comprising cellulose and starch connected by at least one cross-linker, methods of producing the copolymers, and formed articles comprising the copolymers are described herein. The copolymers may be biodegradable and may have improved physical properties when compared to the homopolymers and other biodegradable polymers. In some embodiments, the copolymer may be more flexible than unmodified cellulose may have better structural integrity than unmodified starch.

9 Claims, No Drawings

COPOLYMERS OF STARCH AND CELLULOSE

CLAIM OF PRIORITY

This application is a U.S. national stage filing under 35 U.S.C. §371 of International Application No. PCT/US2012/063643 filed Nov. 6, 2012 entitled "COPOLYMERS OF STARCH AND CELLULOSE" which is incorporated herein by reference.

BACKGROUND

Approximately 140 million tons of petroleum-based polymers are produced annually, and after their initial use, large portions of these are introduced into the natural ecosystem as waste products. Novel bioplastics incorporating starch, polylactic acid, polyhydroxybutyrate, cellulose, and various copolymers make up about 300,000 tons of the total polymer production, and their production is growing at a rate of 20% per year. These composite polymers need to be high in molecular weight to provide strength, substituted to confer flexibility, moderately crystalline to impart moisture and vapor pressure resistance and with engineered points of inflection including intermolecular ester-etherification regions to initiate biodegradation. The natural degradation process of these polymers requires moisture, humidity, temperature and microbial action to facilitate the degradation. Currently, the functionality of these bioplastics suffers from high water absorption, brittleness, deformation during processing, and shelf life with environmental factors, such as UV radiation and relative humidity, increasing the rate of instability associated with the material being packaged.

SUMMARY

In some embodiments, copolymers may include cellulose and starch connected by at least one cross-linker. In some embodiments, the copolymer may be biodegradable. In some embodiments, the copolymer may be able to be extruded, sheeted, pressed, laminated, blow-molded, or a combination thereof. In some embodiments, the copolymer may further include at least one substituent selected from propylene oxide, acetate, maleic, carboxymethyl cellulose, pectin, glycerol, and combinations thereof.

In certain embodiments, methods of preparing a copolymer may include providing a starch and a cellulose; combining the cellulose and the starch; providing a crosslinking agent; and contacting the combined cellulose and starch with the crosslinking agent to produce the copolymer. In some embodiments, a method may further include providing a substitution agent; and contacting the combined cellulose and starch with the substitution agent.

In further embodiments, formed articles may comprise any of the copolymers described herein. In some embodiments, a formed article may be produced by extruding, sheeting, pressing, laminating, thermoforming, injecting, and/or blow-molding the copolymer.

In still further embodiments, methods of making a biodegradable, water-proof laminate are described. In certain embodiments, a method may include forming a biodegradable copolymer composed of cellulose and starch, wherein the cellulose and the starch are connected by at least one cross-linker, and extruding the biodegradable copolymer into a laminate film.

In other embodiments, methods of making a biodegradable liquid paperboard are described. In certain embodiments, a method may include heating wood chips in a solution having water and a solute to form a pulp, contacting the pulp with a copolymer composed of cellulose and starch, wherein the cellulose and the starch are connected by at least one cross-linker, removing at least a portion of water from the pulp to form a moist pulp, and rolling the moist pulp over heated cylinders to form a dry paperboard. In some embodiments, the solute may be, for example, sodium sulphate, sodium sulphite, potassium sulphite, calcium sulphite, magnesium sulphite, ammonium sulphite, sodium hydroxide, calcium hydroxide, sodium carbonate, calcium oxide, or combinations thereof.

DETAILED DESCRIPTION

Described herein are copolymers including cellulose and starch connected by at least one cross-linker, compositions including these copolymers, methods of producing the copolymers and compositions used in these methods, and articles of manufacture including the copolymers. Particular embodiments are directed to methods of making biodegradable, water-proof laminate from the copolymers described herein and methods of making biodegradable liquid paperboard. The copolymers are, generally, biodegradable and exhibit improved physical properties when compared to cellulose and starch homopolymers and other biodegradable polymers.

Various embodiments include a copolymer of cellulose and starch connected by at least one cross-linker, and in some embodiments, the copolymer may further include at least one substituent selected from propylene oxide, acetate, maleic, carboxymethyl cellulose, pectin, glycerol, and combinations thereof. Such copolymers are generally biodegradable, and in some embodiments, these copolymers may be able to be extruded, sheeted, pressed, laminated, blow-molded, or a combination thereof. Thus, certain embodiments are directed to extruded, sheeted, pressed, laminated, or blow-molded copolymers and other forms or articles including these copolymers.

The starch component may be from any source including, for example, corn, potatoes, wheat, or a combination thereof. In some embodiments, the starch may comprise a starch that has been jet cooked, acid washed, homogenized, enzyme treated, sonicated, or a combination thereof. Therefore, the starch component may include fragmented, partially fragments, denatured, or partially denatured starches. In some embodiments, the starch may be a high amylose starch. For example, the starch may have an amylose content of about 50% to about 80%, about 55% to about 75%, about 60% to about 70% or any range or individual value encompassed by these exemplary ranges. More specific exemplary, non-limiting, starches include those having an amylose content of about 50%, about 55%, about 60%, about 62%, about 64%, about 66%, about 68%, about 70%, about 72%, about 74%, about 76%, about 78%, about 80% and any amount or range of amounts between those listed, inclusive of endpoints.

The amount of starch in the copolymers described herein can vary among embodiments, and starch will, generally, make up the major constituent of the copolymer. For example, in some embodiments, the copolymer may have a starch content of about 60 weight percent (wt. %) to about 98 wt. %, about 70 wt. % to about 95 wt. %, about 80 wt. % to about 90 wt. % or any range or individual value encompassed by these exemplary ranges. In particular embodiments, the copolymers may have a starch content of about 60 wt. %, about 65 wt. %, about 70 wt. %, about 75 wt. %, about 80 wt. %, about 82 wt. %, about 84 wt. %, about 86 wt. %, about 88 wt. %, about 90 wt. %, about 92 wt. %, about 95 wt. %, about 98 wt. %, or any amount or range of amounts between those listed, inclusive of endpoints.

The cellulose used in the copolymers described herein may be from any source. For example, in some embodiments, the cellulose may be from softwood, hardwood, recycled paper, rice hulls, sugar cane, sugar beet, wheat or corn husks, bamboo, coconut, cocoa bean hulls, and the like or combinations thereof. In some embodiments, the cellulose may be treated to remove at least a portion of hemicellulose, lignin, sugar, phenolic compounds (including those derived from, but not limited to, benzoic acid and cinnamic acids), poly phenyl oxidase, and the like or combinations thereof. Thus, the cellulose of some embodiments may have a reduced amount when compared to naturally occurring cellulose from the identified sources or none of these components. In some embodiments, the amount or composition of hemicellulose, lignin, sugar, or phenolic compounds present in the cellulose may be dependent on the source of the cellulose. In some embodiments, the cellulose may include a cellulose which may be alkali treated, acid washed, homogenized, sonicated, or a combination thereof. Therefore, copolymers including fragmented or denatured or partially fragmented or denatured cellulose are encompassed by embodiments. In some embodiments, the cellulose may include at least one substituent such as, but not limited to, treatment by sulphites, sodium hydroxide, peroxides, propylene oxide, phosphorous oxychloride, acetate, maleic, nitrate, sodium octenyl or aluminum succinate, chloride, epichlorohydrin hydroxypropyl reaction or phosphorylation by phosphoric anhydrides, mixed phosphate esters including sodium tripolypolyphosphates or sodium trimetaphosphate. Without wishing to be bound by theory, substituted cellulose may improve flexibility of the copolymer by providing steric interference and reducing the linearity.

Various crosslinkers may be included in the copolymers described herein. For example, in some embodiments, the at least one cross-linker can include di-acyl radicals having optionally substituted $C_2$ to $C_{10}$ hydrocarbon chains. In particular embodiments, the at least one cross-linker may be malonyl, succinyl, maleyl, glutaryl, adipyl, and the like and combinations thereof.

The copolymers described above generally exhibit a good combination of physical properties while providing a biodegradable material. For example, in some embodiments, the copolymer may have better structural integrity than the structural integrity of unmodified starch. In some embodiments, the crosslinker may improve the structural integrity of the copolymer by joining the inversely paired α-1,4 glucose linkages in starch and β-1,4 glucose linkages in cellulose.

Further embodiments include methods for preparing a copolymer may including providing a starch and a cellulose; combining the cellulose and the starch; providing a crosslinking agent; and contacting the combined cellulose and starch with the crosslinking agent to produce a copolymer. In some embodiments, the method may further include providing a substitution agent such as, for example, propylene oxide, acetate, carboxymethyl cellulose, pectin, glycerol, and the like and combinations thereof; and contacting the combined cellulose and starch with the substitution agent.

The ratio of cellulose to starch in the mixture may vary. For example, in some embodiments, the cellulose and the starch weight ratio may be about 1:1, about 1:2, about 1:3, about 1:4, about 1:5, about 1:6, about 1:7, about 1:8, about 1:9, about 1:10, about 1:11, about 1:12, about 1:13, about 1:14, about 1;15, about 1:16, about 1:17, about 1:18, about 1:19, about 1:20, or any ratio or range of ratios between those listed, inclusive of endpoints.

In some embodiments, the method may include washing the mixture at low pH such as, for example, about pH 1 to about pH 4, about pH 1, about pH 2, about pH 3, about pH 4, or any pH or pH range between those listed, inclusive of endpoints, to remove phenolics. In still other embodiments, the method may include swelling the cellulose and starch at a high pH such as, for example, about pH 7 to about pH 11, about pH 7, about pH 8, about pH 9, about pH 10, about pH 11, or any pH or pH range between those listed, inclusive of endpoints to effect the chemical substitution) after washing at low pH, and still further embodiments can include reducing the pH to within an acidic range such as, for example, about pH 3 to about pH 6.9, about pH 3, about pH 4, about pH 5, about pH 6, about pH 6.9, or any pH or pH range between those listed, inclusive of endpoints, after swelling to effectuate a partial crystallization of the copolymer. Without wishing to be bound by theory, the additional steps of washing, swelling, and reducing the pH may strength the structure of the copolymer. In other embodiments, a similar affect can be achieved by reacting the mixture in a counter current reactor such as, for example, a D-Tank having an Archimedes screw and a gradient pH solution starting at about pH 3 and moving to about pH 9 and then back to about pH 4 to about pH 6.

The step of contacting the combined cellulose and starch with the crosslinking agent may occur for any period of time necessary to achieve sufficient crosslinking for good structural integrity. For example, crosslinking may be carried out for about 0.5 hours to about 5 hours, about 1 hour to about 4 hours, about 2 hours to about 3 hours, or about 0.5 hours, about 1 hour, about 2 hours, about 3 hours, about 4 hours, about 5 hours, or any time or range of time between those listed. Contacting the combined cellulose and starch with the crosslinking agent can be carried out at room temperature, or the mixture of cellulose, starch and crosslinking agent may be heated. Thus, some embodiments include the step heating a mixture of cellulose, starch and crosslinking agent. For example, in some embodiments, this contacting may be carried out at about 20° C. to about 60° C., about 20° C., about 30° C., about 40° C., about 50° C., about 60° C., or any temperature or range of temperatures between those listed, inclusive of endpoints. While ambient temperatures may be sufficient, minor elevations in chemical reaction temperatures may increase the rate of reaction.

Some methods can include steps for processing starch before providing the starch. For example, in some embodiments, processing starch may include heating a high amylose starch and washing the heated starch with an acid such as, for example, phosphoric acid, acetic acid, hydrochloric acid, maleic acid, citric acid, and the like and combinations thereof. Heating the high amylose starch can be carried out by any means including, for example, jet cooking. In some embodiments, processing the starch may further include homogenizing the washed starch, and in certain embodiments, homogenizing can be carried out at a pressure of about 6,000 psi, about 7,000 psi, about 8,000 psi, about 9,000 psi, about 10,000 psi, or any pressure or range of pressures between those listed, inclusive of endpoints. In other embodiments, processing the starch may include sonicating the washed starch at a frequency of, for example, about 60 kHz, about 100 kHz, about 200 kHz, about 300 kHz, about 400 kHz, about 500 kHz, about 600 kHz, about 700 kHz, about 800 kHz, about 900 kHz, about 1,000 kHz, or any frequency or range of frequencies between those listed, inclusive of endpoints.

Some methods can also include processing the cellulose before providing cellulose. For example, in some embodiments include the step of treating the cellulose to remove hemicellulose, lignin, sugar, poly phenyl oxidase, and the like or a combination thereof. Such methods may further include contacting the treated cellulose with an alkali such as, for example, sodium hydroxide, potassium hydroxide, and the like and washing the alkali-contacted cellulose with an acid such as, for example, phosphoric acid, phosphinic acid, phosphonic acid, acetic anhydride, acetic acid, and the like. Treating can be carried out by any means. For example, treating can be carried out by a two-staged milling and washing process. In some embodiments, processing cellulose may further include homogenizing the cellulose, and in some embodiments, the homogenizing can be carried out at a pressure of about 6,000 psi, about 7,000 psi, about 8,000 psi, about 9,000 psi, about 10,000 psi, or any pressure or range of pressures between those listed, inclusive of endpoints. In other embodiments, processing the cellulose may further include sonicating the cellulose a frequency of, for example, about 60 kHz, about 100 kHz, about 200 kHz, about 300 kHz, about 400 kHz, about 500 kHz, about 600 kHz, about 700 kHz, about 800 kHz, about 900 kHz, about 1,000 kHz, or any frequency or range of frequencies between those listed, inclusive of endpoints.

Some methods further include preparing a crosslinking agent. For example, a crosslinking agent can be prepared by contacting a di-acid with acetic anhydride. The di-acid may be a di-acid that includes a substituted or unsubstituted $C_2$ to $C_{10}$ hydrocarbon, and in some embodiments, the di-acid may be malonic acid, succinic acid, maleic acid, glutaric acid, adipic acid, and the like and combinations thereof.

Any of the copolymers described herein can be formed into an article or other useful object such as, for example, food trays, pallets, packaging trays, bottles, foils, papers, boards, eating utensil or food plates, packing spacers, bottle caps, various containers, banners, microwavable containers and packaging, signs, posters, loose fill for packaging, sheets, or cases for thermoforming or injection molding. Thus, in certain embodiments, methods may include the step of forming the copolymer by methods such as extruding, sheeting, pressing, laminating, thermoforming, injecting, blow-molding, and the like and combinations thereof. In some embodiments, the formed article may be.

The copolymers described herein may be used for any purpose. In certain embodiments, the copolymers may be used for making biodegradable, water-proof laminates. In some embodiments, a method for making a biodegradable, water-proof laminate may include forming a biodegradable copolymer of cellulose and starch such as those described above, and extruding the biodegradable copolymer into a laminate film. In some embodiments, the starch may constitute about 80 wt. %, about 82 wt. %, about 84 wt. %, about 86 wt. %, about 88 wt. %, about 90 wt. %, or any value between any two of these values, of the copolymer. In some embodiments, the starch may be a high amylose starch.

In particular embodiments, the extruding step is carried out using a twin-screw extruder having about 5 to about 7 temperature zones that can range in the temperature zones may vary from about 65° C. to about 125° C. The temperature in successive temperature zones may increase monotonously in some embodiments, and in certain embodiments, the temperature in successive temperature zones may initially increase to a peak value and then decrease for the later zones. For example, in embodiments with 5 temperature zones, the temperature of the first zone may be about 65° C., the temperature of the second zone may be about 75° C., the third zone may have a temperature of about 90° C., the fourth zone may have a temperature of about 125° C., and the fifth zone may have a temperature of about 95° C. In embodiments with 7 temperature zones, the first temperature zone may be at about 65° C., the second zone may be at about 80° C., the third may be at about 95° C., the fourth may be at about 110° C., the fifth may be at about 125° C., the sixth at about 110° C., and the seventh at about 95° C. Various permutations of temperature zones are possible for various embodiments. In some embodiments, the temperature between two successive temperature zones may differ by about 5° C., about 10° C., about 15° C., about 20° C., about 25° C., about 30° C., about 35° C., about 40° C., about 50° C., about 55° C., about 60° C., or any value between any two of these values.

In various embodiments, the twin-screw pressure may be varied. In some embodiments, the pressure may be about 20 Bar, about 25 Bar, about 30 Bar, about 35 Bar, about 40 Bar, or any value between any two of these values. The rotation of the twin-screw determines the speed at which a laminate film is extruded. In some embodiments, the screws may be rotated at about 50 rotations per minute (rpm), about 55 rpm, about 60 rpm, about 65 rpm, about 70 rpm, or any value between any two of these values, resulting in an extrusion speed of about 0.125 meters/minute (m/min), about 0.12 m/min, about 0.115 m/min, about 0.10 m/min, or any value between any two of these values.

Embodiments are additionally directed to methods of making biodegradable liquid paperboard. A method for making biodegradable liquid paperboard may include heating wood chips in a solution to form a pulp, contacting the pulp with a copolymer including cellulose and starch that are connected by at least one cross-linker, removing at least a portion of water from the pulp to form a moist pulp, and rolling the moist pulp over heated cylinders to form a dry liquid paperboard.

In some embodiments, the solution to form a pulp may include salts such as, for example, sodium sulphate, sodium sulphite, sodium sulphide, sodium metabisulphite, potassium sulphite, calcium sulphite, magnesium sulphite, sodium hypochlorite, calcium hypochlorite, hypochlorous acid, peracetic acid, persulphate, permanganate, ammonium sulphite, sodium hydroxide, calcium hydroxide, sodium carbonate, calcium oxide, sodium chloride, calcium chloride, hydrogen peroxide, and chlorine dioxide. In various embodiments, the salts may be used for controlling the hydration and rate of substitution reaction. Typical concentration of salts used may be about 0.5% to about 5% by weight depending on the conditions and the particular salt being used. In some embodiments, the solution may be treated at room temperature, and in certain embodiments, the solution may be heated to a temperature of about 50° C. In embodiments where the solution has an alkaline pH (from about 9 to about 11) the solution may be heated to a temperature of about 80° C. to about 120° C. In various embodiments, it may be desirable for the solution to have reduced moisture (less than about 20%) so as to allow expansion of the starch. In such embodiments, the moist pulp may be heated to a temperature of about 80° C. to about 120° C. In various embodiments, solution may be heated for about 1 hour to about 4 hours under atmospheric pressure.

In some embodiments, the method may further include disposing a layer of biodegradable, water-proof laminate on the dry liquid paperboard, and in certain embodiments, the biodegradable, water-proof laminate may include biodegradable copolymer of cellulose and starch connected by at least one cross-linker such as those copolymers described above. Various embodiments further include laminates having multiple layers of the biodegradable liquid paperboard and the biodegradable, water-proof laminate. In some embodiments, the layers may be alternately stacked such that a laminate layer separates two successive paperboard layers, and in particular embodiments, the top and the bottom layers may be made from the laminate. For example, for a multi-layer laminate having 5 layers, the first layer may a laminate, the second may be a paperboard, the third may be a laminate, the fourth may be a paperboard, and the fifth may be a laminate layer. Various other permutations may be configured using the paperboard and the laminate layers. Such layered paperboard-laminate sheets may be used for any suitable purpose known in the art, such as, for example, for making storage containers for dairy and dairy products, beverages, and the like, for making food trays, plates, and the like, for making food storage containers, for making packaging trays for transporting food, fruits, meats, and the like, and so forth.

EXAMPLES

Example 1: Cellulose Preparation

Cellulose is introduced to a two staged size reduction milling and washing process to remove hemicellulose, color, sugar and poly phenol oxidase (PPO). The cellulose is then treated with alkali followed by acid washing in a solution of increasing concentration of acidulants. The alkali treatment is done by either counter current extraction or vat processing. The cellulose may then be jet-cooked and/or ultrasonicated at about 60 kHz to about 1000 kHz to produce micro fibrils for chemical modification. The creation of these micro fibular arrays provides a substrate of exposed high molecular weight polymers which can be substituted (>5%) and cross-linked (<0.6%).

Example 2: High Amylose Starch Preparation

High amylose polymers derived from starch granules are jet cooked. The high amylose starch is processed by ultrasonication at about 60 kHz to about 1000 kHz.

Example 3: Copolymer Preparation

The cellulose from Example 1 and the starch from Example 2 are combined (4:1 weight ratio) in a 20% aqueous solution (Dry Solids Basis) using a high speed, low air incorporation agitation system (Scott Turbines), at temperatures between 25° C. and 40° C. for a period of up to 2 hours, and then substituted by acetylation, esterification, propylation, or succination. The cellulose and the starch are then crosslinked upon addition of maleic or phosphoric acid derivatives as a crosslinker. Swelling is controlled by salt addition in a gradient alkali to acid pH reaction, the ratio of starch to fiber in solution and the inclusion of salt and addition of antimicrobial fractionated oils or sulphides.

The micro fibrils may also be reacted with HA starch and dried to create a new raw material which may be extruded, sheeted and pressed or laminated into thermoformed trays, bottles, crates or utensils. The preparation of these copolymer materials may provide additional structural strength with greater tolerance to moisture and gas transfer compared to traditional bioplastic materials.

Example 4: Formed Articles Using Copolymers

A copolymer of Example 3 is injection molded to form a microwavable container. A bottle is separately blow molded using another copolymer of Example 3.

Example 5: Biodegradable Laminate Preparation

The copolymer of Example 3 is produced and extruded as a film. The film is prepared using a twin-screw extruder, using 5 zones of temperature (65° C.-80° C.-110° C.-125° C.-95° C.) and a moderate shear screw configuration with reverse flights at a pressure of about 30 Bar and screw speed of about 60 rpm such that the exit rate for the film is about 0.1 meters per minute.

Example 6: Biodegradable Liquid Paperboard Preparation

The copolymer is prepared in situ with exposed wood chips during a Kraft paper making process where the jet cooking and sonication step of these polymers are performed and the reaction chemicals are added to the pulp mix with the exposed polymers and allowed to react.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or figure, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

What is claimed is:

1. A copolymer comprising cellulose and starch, wherein the cellulose and the starch are connected by at least one cross-linker, and wherein the starch has an amylose content of about 50 percent to about 80 percent, and wherein the starch is present at about 80 to about 90 weight percent of the copolymer.

2. The copolymer of claim 1, wherein the starch comprises a starch which has been jet cooked, acid washed, homogenized, sonicated, or a combination thereof, and wherein the starch is sourced from corn, potatoes, wheat, or a combination thereof.

3. The copolymer of claim 1, wherein the cellulose has been treated to remove at least a portion of hemicellulose, lignin, sugar, phenolic compounds, poly phenyl oxidase, or a combination thereof from the cellulose.

4. The copolymer of claim 1, wherein the cellulose comprises a cellulose which has been alkali treated, acid washed, homogenized, sonicated, or a combination thereof.

5. The copolymer of claim 1, wherein the cellulose is from a source selected from the group consisting of softwood, hardwood, recycled paper, rice hulls, sugar cane, sugar beet, bamboo, and combinations thereof.

6. The copolymer of claim 1, wherein the at least one cross-linker is a di-acyl radical comprising a substituted $C_2$ to $C_{10}$ hydrocarbon chain or an unsubstituted $C_2$ to $C_{10}$ hydrocarbon chain.

7. The copolymer of claim 1, further comprising at least one substituent selected from the group consisting of propylene oxide, acetate, carboxymethyl cellulose, pectin, glycerol, and combinations thereof.

8. An article comprising the copolymer according to claim 1.

9. The article of claim 8, wherein the article is a food tray, a pallet, a packaging tray, a bottle, a foil, a paper, a board, a utensil or plate, a packing spacer, a bottle cap, a container, a banner, a microwavable container, a sign, loose fill for packaging, a sheet for thermoforming, a case for thermoforming, or a case for injection molding.

* * * * *

UNITED STATES PATENT AND TRADEMARK OFFICE
CERTIFICATE OF CORRECTION

PATENT NO. : 9,745,699 B2
APPLICATION NO. : 14/440923
DATED : August 29, 2017
INVENTOR(S) : Patane Page 1 of 1

It is certified that error appears in the above-identified patent and that said Letters Patent is hereby corrected as shown below:

In the Specification

In Column 3, Line 31, delete "chloride," and insert -- aluminium chloride, --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*